(12) United States Patent
Yarbrough et al.

(10) Patent No.: US 10,072,632 B2
(45) Date of Patent: Sep. 11, 2018

(54) SPAR CAP FOR A WIND TURBINE ROTOR BLADE FORMED FROM PRE-CURED LAMINATE PLATES OF VARYING THICKNESSES

(71) Applicant: General Electric Company, Schenectady, NY (US)

(72) Inventors: Aaron A. Yarbrough, Clemson, SC (US); Christopher Daniel Caruso, Greenville, SC (US)

(73) Assignee: General Electric Company, Schenectady, NY (US)

( * ) Notice: Subject to any disclaimer, the term of this patent is extended or adjusted under 35 U.S.C. 154(b) by 537 days.

(21) Appl. No.: 14/754,764

(22) Filed: Jun. 30, 2015

(65) Prior Publication Data
US 2017/0002791 A1 Jan. 5, 2017

(51) Int. Cl.
*F03D 1/06* (2006.01)
*B32B 7/02* (2006.01)
(Continued)

(52) U.S. Cl.
CPC ............ *F03D 1/0675* (2013.01); *B32B 1/00* (2013.01); *B32B 5/02* (2013.01); *B32B 5/18* (2013.01);
(Continued)

(58) Field of Classification Search
CPC . B29C 70/023; B29C 70/083; B29D 99/0028; B29B 11/16; B29L 2031/085; Y02E 10/74; Y02E 10/721; Y02E 10/722; Y02B 70/523; F03D 80/00; F03D 9/25; F03D 1/0675; F05B 2220/30;
(Continued)

(56) References Cited

U.S. PATENT DOCUMENTS 6,264,877 B1 7/2001 Pallu De La Barriere
7,473,385 B2 1/2009 Stiesdal et al.
(Continued)

FOREIGN PATENT DOCUMENTS

CA 2526407 11/2012
CN 201155423 Y 11/2008
(Continued)

OTHER PUBLICATIONS

European Search Report and Opinion issued in connection with corresponding EP Application No. 16177105.0 dated Nov. 30, 2016.

*Primary Examiner* — Logan Kraft
*Assistant Examiner* — Joshua R Beebe
(74) *Attorney, Agent, or Firm* — Dority & Manning, P.A.

(57) ABSTRACT

A spar cap for a rotor blade of a wind turbine may generally include an assembly of pre-cured laminate plates stacked on one top of the other, with the assembly including an outermost pre-cured plate, an innermost pre-cured plate positioned opposite the outermost pre-cured plate and a plurality of intermediate pre-cured plates stacked directly between the outermost and innermost pre-cured plates. The outermost pre-cured plate may be configured to be positioned adjacent to an inner surface of a body shell of the rotor blade. In addition, the outermost pre-cured plate may define a plate thickness that differs from a plate thickness defined by the innermost pre-cured plate by at least 50%.

15 Claims, 10 Drawing Sheets

(51) Int. Cl.
- *B32B 5/02* (2006.01)
- *B32B 5/18* (2006.01)
- *B32B 5/24* (2006.01)
- *B32B 5/26* (2006.01)
- *B32B 7/12* (2006.01)
- *B32B 21/04* (2006.01)
- *B32B 21/10* (2006.01)
- *B32B 21/14* (2006.01)
- *B32B 1/00* (2006.01)

(52) U.S. Cl.
CPC ............... *B32B 5/245* (2013.01); *B32B 5/26* (2013.01); *B32B 7/02* (2013.01); *B32B 7/12* (2013.01); *B32B 21/047* (2013.01); *B32B 21/10* (2013.01); *B32B 21/14* (2013.01); *B32B 2260/021* (2013.01); *B32B 2260/023* (2013.01); *B32B 2260/046* (2013.01); *B32B 2262/101* (2013.01); *B32B 2262/106* (2013.01); *B32B 2266/0228* (2013.01); *B32B 2307/732* (2013.01); *B32B 2603/00* (2013.01); *F05B 2230/50* (2013.01); *F05B 2240/30* (2013.01); *F05B 2250/36* (2013.01); *Y02E 10/721* (2013.01); *Y02P 70/523* (2015.11)

(58) Field of Classification Search
CPC .......... F05B 2220/20; F05B 2240/2211; F05B 2280/6003; F05B 2250/36; F05B 2230/50; F05B 2240/30; B32B 2262/101; B32B 2262/106; B32B 2262/0228; B32B 2307/732; B32B 2260/021; B32B 2260/023; B32B 2260/046; B32B 2603/00; B32B 1/00; B32B 21/047; B32B 21/10; B32B 21/14; B32B 7/12; B32B 7/02; B32B 5/26; B32B 5/245; B32B 5/18

See application file for complete search history.

(56) References Cited

U.S. PATENT DOCUMENTS

| | | | |
|---|---|---|---|
| 7,625,185 | B2 | 12/2009 | Wobben |
| 8,079,818 | B2 | 12/2011 | Burchardt et al. |
| 8,142,162 | B2 | 3/2012 | Godsk et al. |
| 8,168,027 | B2 | 5/2012 | Jacobsen et al. |
| 8,172,538 | B2 | 5/2012 | Hancock et al. |
| 8,297,932 | B2 | 10/2012 | Arocena De La Rua et al. |
| 8,317,479 | B2 | 11/2012 | Vronsky et al. |
| 8,348,622 | B2 | 1/2013 | Bech |
| 8,353,674 | B2 | 1/2013 | Bech |
| 8,506,258 | B2 | 8/2013 | Baker et al. |
| 8,511,996 | B2 | 8/2013 | Llorente Gonzalez et al. |
| 8,540,491 | B2* | 9/2013 | Gruhn .................... B29B 11/16 416/230 |
| 8,657,581 | B2 | 2/2014 | Pilpel et al. |
| 8,673,106 | B1 | 3/2014 | Jolley et al. |
| 8,747,098 | B1 | 6/2014 | Johnson et al. |
| 8,826,534 | B2 | 9/2014 | Cappelli et al. |
| 8,961,142 | B2 | 2/2015 | Wansink |
| 8,992,813 | B2 | 3/2015 | Robbins et al. |
| 2009/0148300 | A1 | 6/2009 | Driver et al. |
| 2011/0045276 | A1 | 2/2011 | Grove-Nielsen |
| 2011/0318186 | A1 | 12/2011 | Kristensen et al. |
| 2012/0027609 | A1* | 2/2012 | Ogde .................... B29C 70/86 416/226 |
| 2012/0039720 | A1 | 2/2012 | Bech |
| 2012/0180582 | A1 | 7/2012 | Piasecki |
| 2012/0230830 | A1 | 9/2012 | Lind et al. |
| 2013/0022466 | A1 | 1/2013 | Laurberg |
| 2013/0108453 | A1 | 5/2013 | Baker et al. |
| 2013/0129518 | A1 | 5/2013 | Hayden et al. |
| 2013/0149154 | A1 | 6/2013 | Kuroiwa et al. |
| 2013/0149166 | A1 | 6/2013 | Schibsbye |
| 2013/0164133 | A1 | 6/2013 | Grove-Nielsen |
| 2013/0195661 | A1 | 8/2013 | Lind et al. |
| 2013/0237356 | A1 | 9/2013 | Pasch |
| 2013/0294925 | A1* | 11/2013 | Appleton ............... B29C 70/086 416/241 R |
| 2013/0333823 | A1 | 12/2013 | Hedges et al. |
| 2014/0003956 | A1* | 1/2014 | Lull ....................... B29C 70/865 416/230 |
| 2014/0023513 | A1 | 1/2014 | Johnson et al. |
| 2014/0030094 | A1 | 1/2014 | Dahl et al. |
| 2014/0119936 | A1 | 5/2014 | Dahl et al. |
| 2014/0271198 | A1* | 9/2014 | Liu ........................ F03D 1/0675 416/132 B |
| 2014/0271217 | A1* | 9/2014 | Baker .................... F03D 1/0633 416/226 |
| 2014/0295187 | A1 | 10/2014 | Jacobsen et al. |
| 2014/0301859 | A1* | 10/2014 | Hancock ................ F03D 1/0675 416/230 |
| 2015/0316027 | A1* | 11/2015 | Sandercock ............ B29C 70/52 416/230 |
| 2016/0305399 | A1* | 10/2016 | Spandley .............. B29C 70/342 |
| 2016/0348644 | A1* | 12/2016 | Hayden .................... B32B 5/26 |

FOREIGN PATENT DOCUMENTS

| | | |
|---|---|---|
| CN | 100476200 C | 4/2009 |
| CN | 101725481 A | 6/2010 |
| CN | 101906251 A | 12/2010 |
| CN | 101302302 B | 2/2011 |
| CN | 101194102 B | 4/2012 |
| CN | 102459881 A | 5/2012 |
| CN | 102705157 A | 10/2012 |
| DE | 102011051172 A1 | 12/2012 |
| DE | 102012219224 B3 | 3/2014 |
| DK | 201270816 A | 1/2014 |
| DK | 201270818 A | 1/2014 |
| EP | 2113373 B1 | 1/2011 |
| EP | 2255957 B1 | 7/2013 |
| EP | 2679804 A1 | 1/2014 |
| EP | 2679806 A1 | 1/2014 |
| EP | 2682256 A1 | 1/2014 |
| GB | 2451192 A | 1/2009 |
| GB | 2455044 A | 6/2009 |
| JP | 2007092716 A | 4/2007 |
| JP | 3930200 B2 | 6/2007 |
| JP | 2011032987 A | 2/2011 |
| JP | 2011038518 A | 2/2011 |
| JP | 5439412 B2 | 3/2014 |
| WO | WO 03/082551 A1 | 10/2003 |
| WO | WO 2010/025830 A2 | 3/2010 |
| WO | WO 2010/057502 A3 | 5/2010 |
| WO | WO 2011/088835 A2 | 7/2011 |
| WO | WO 2012/042261 A1 | 4/2012 |
| WO | WO 2012/140039 A2 | 10/2012 |
| WO | WO 2013/007351 A1 | 1/2013 |
| WO | WO 2013/060582 A1 | 5/2013 |
| WO | WO 2013/178228 A1 | 12/2013 |
| WO | WO 2014/044280 A1 | 3/2014 |
| WO | WO2014/049354 A1 | 4/2014 |
| WO | WO 2014/063944 A1 | 5/2014 |
| WO | WO 2015/015202 A1 | 2/2015 |
| WO | 2015070876 A1 | 5/2015 |

* cited by examiner

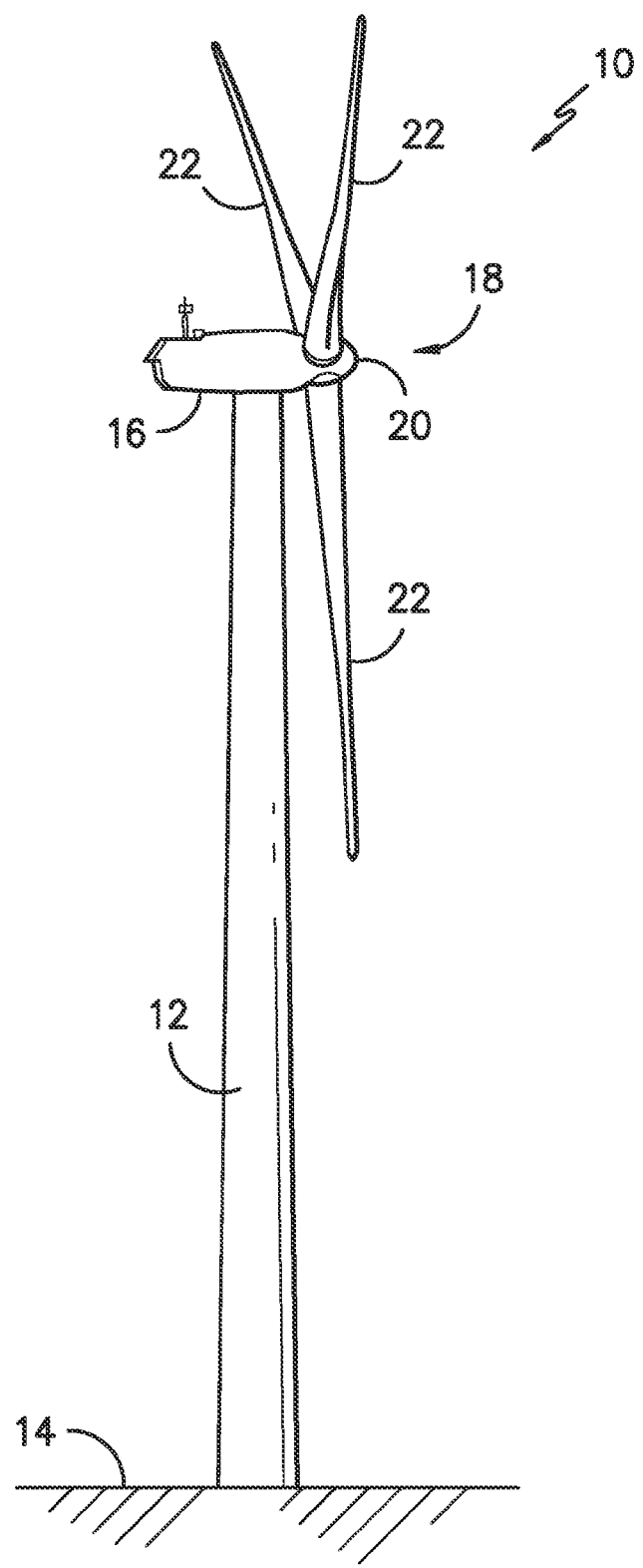
FIG. -1-

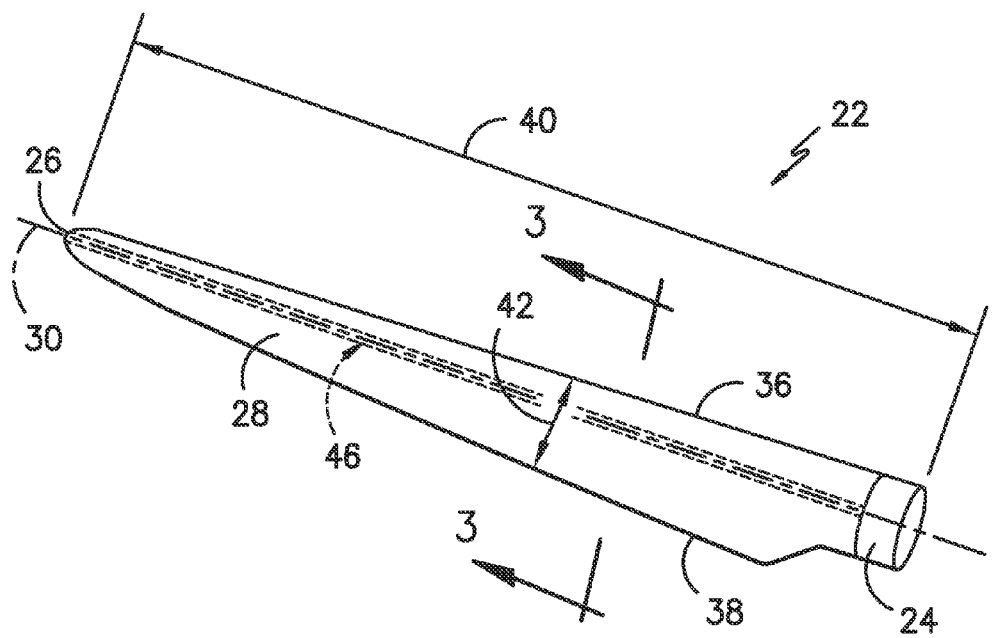
FIG. -2-
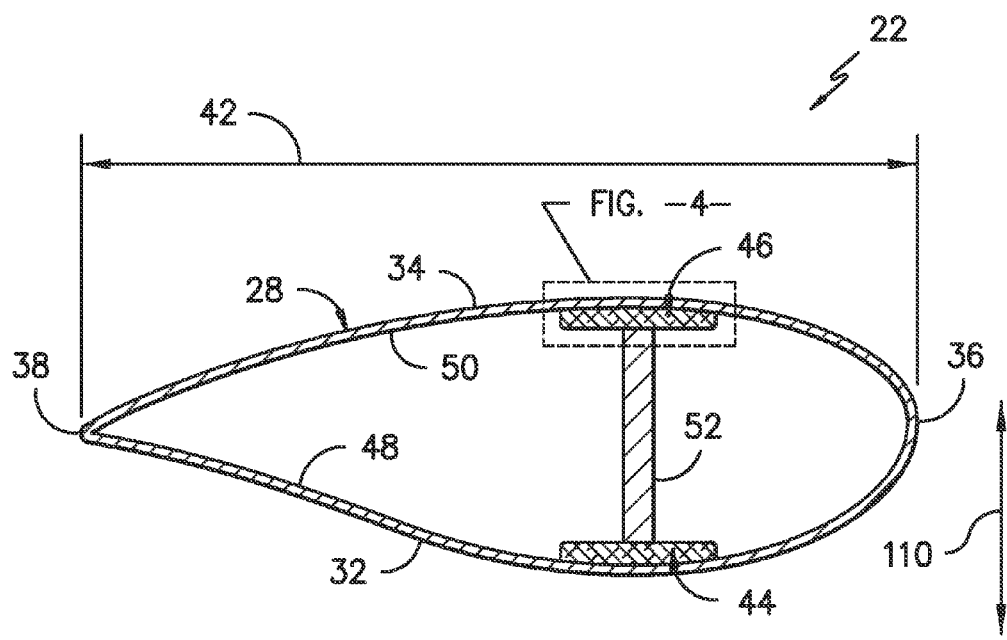
FIG. -3-

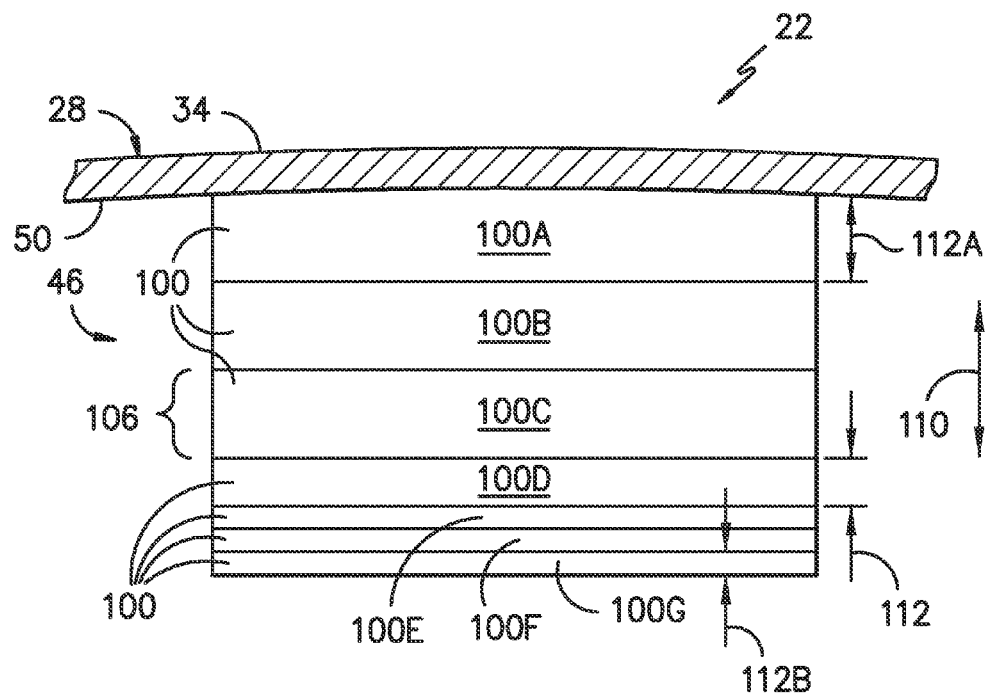
FIG. -4-
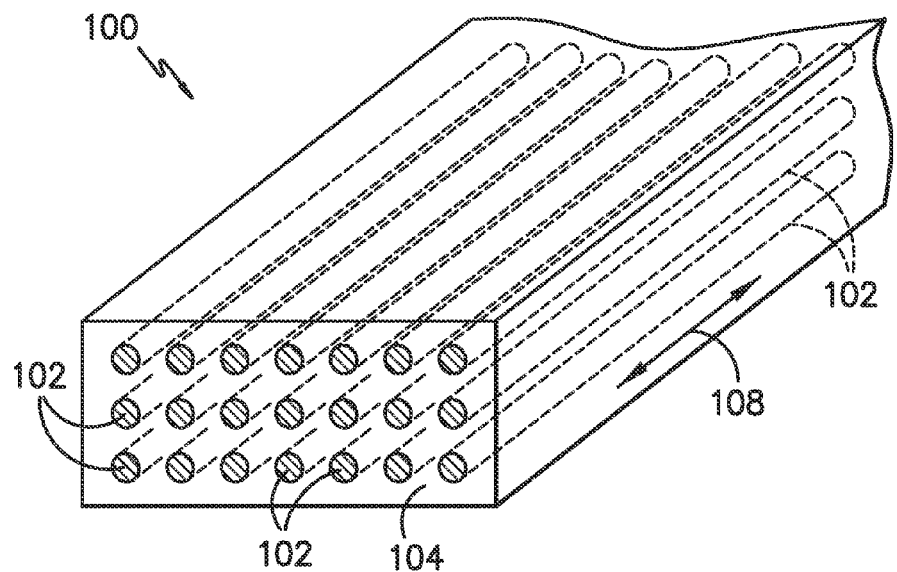
FIG. -5-

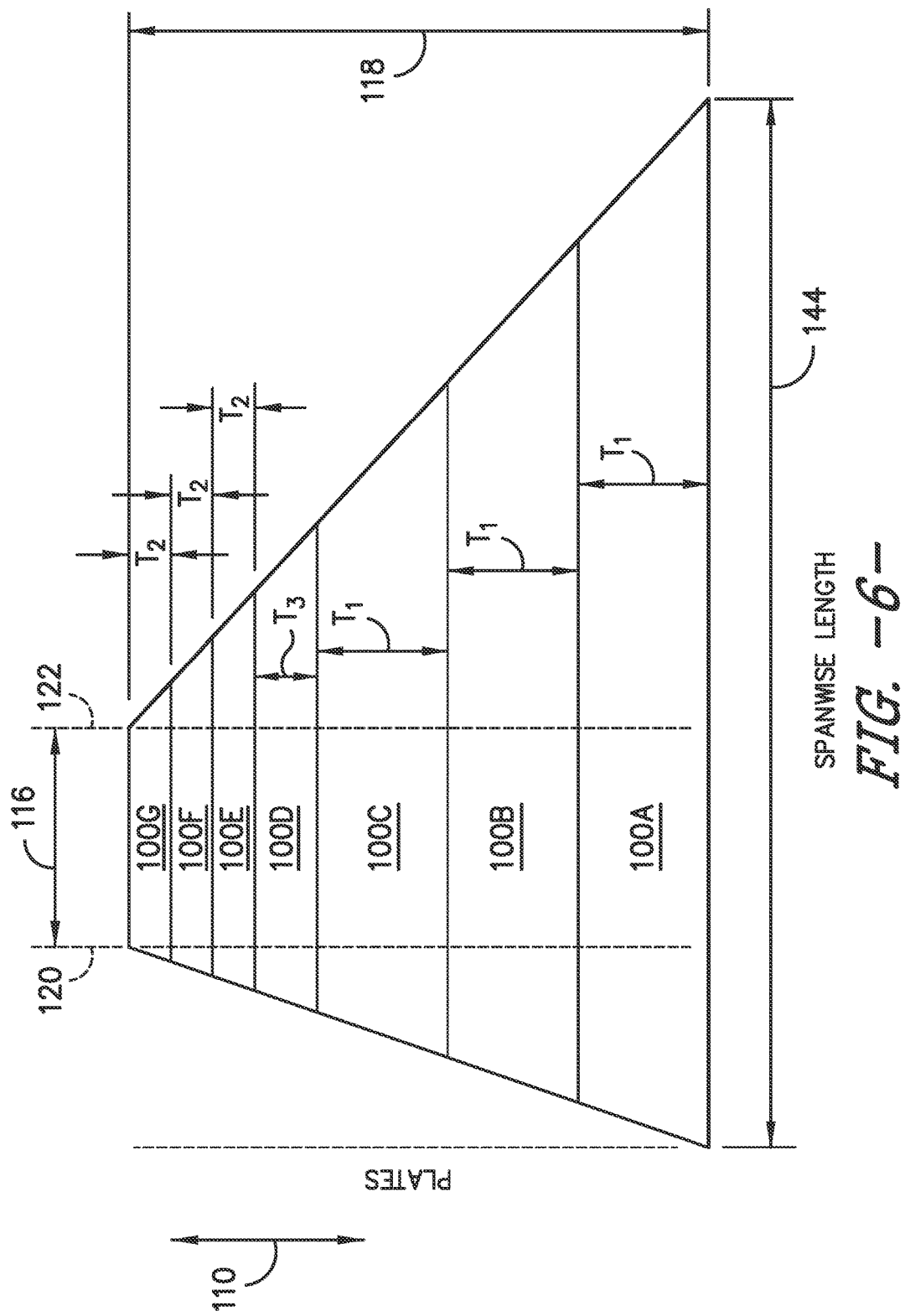
FIG. -6-

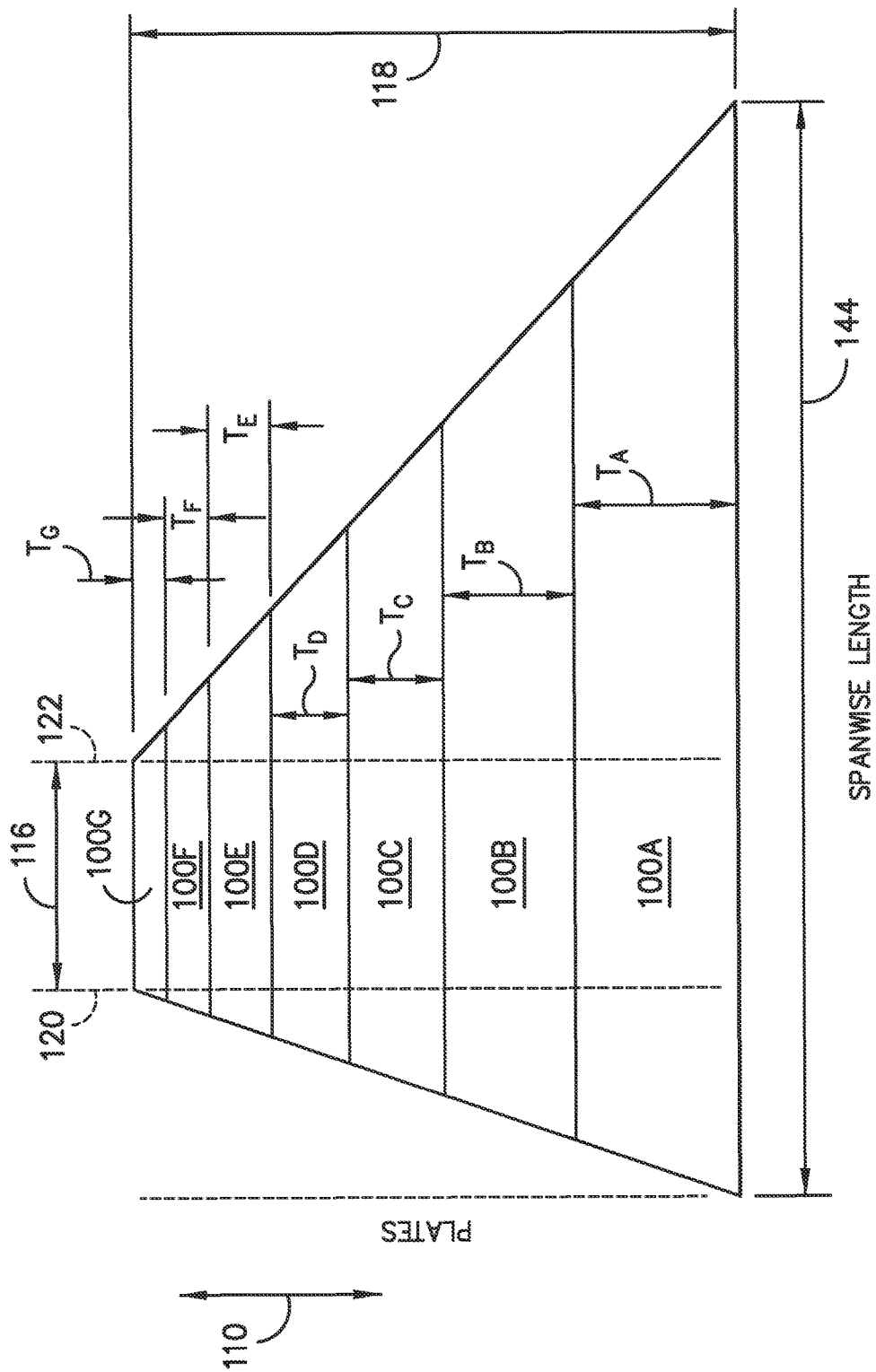
FIG. -7-

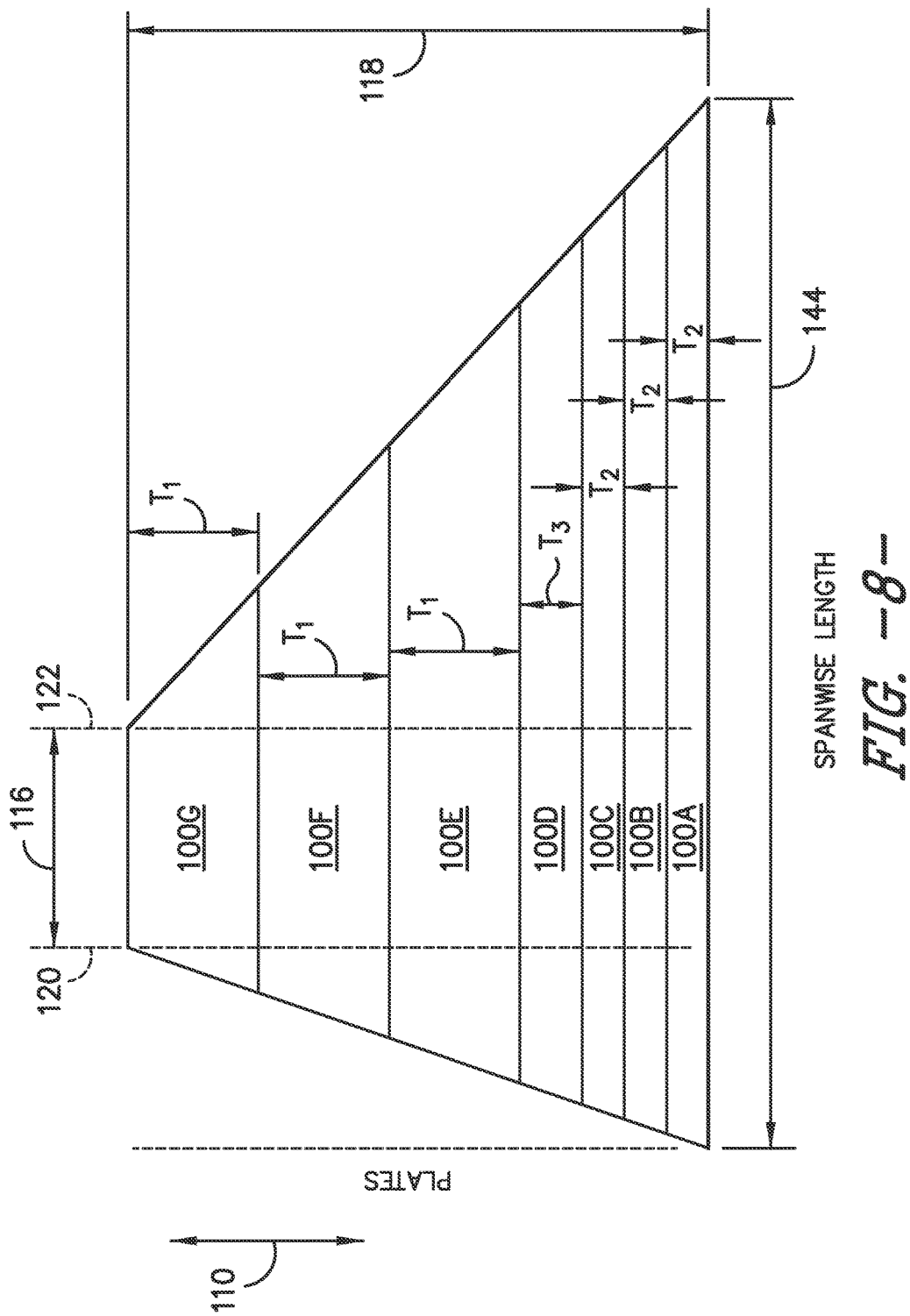
FIG. -8-

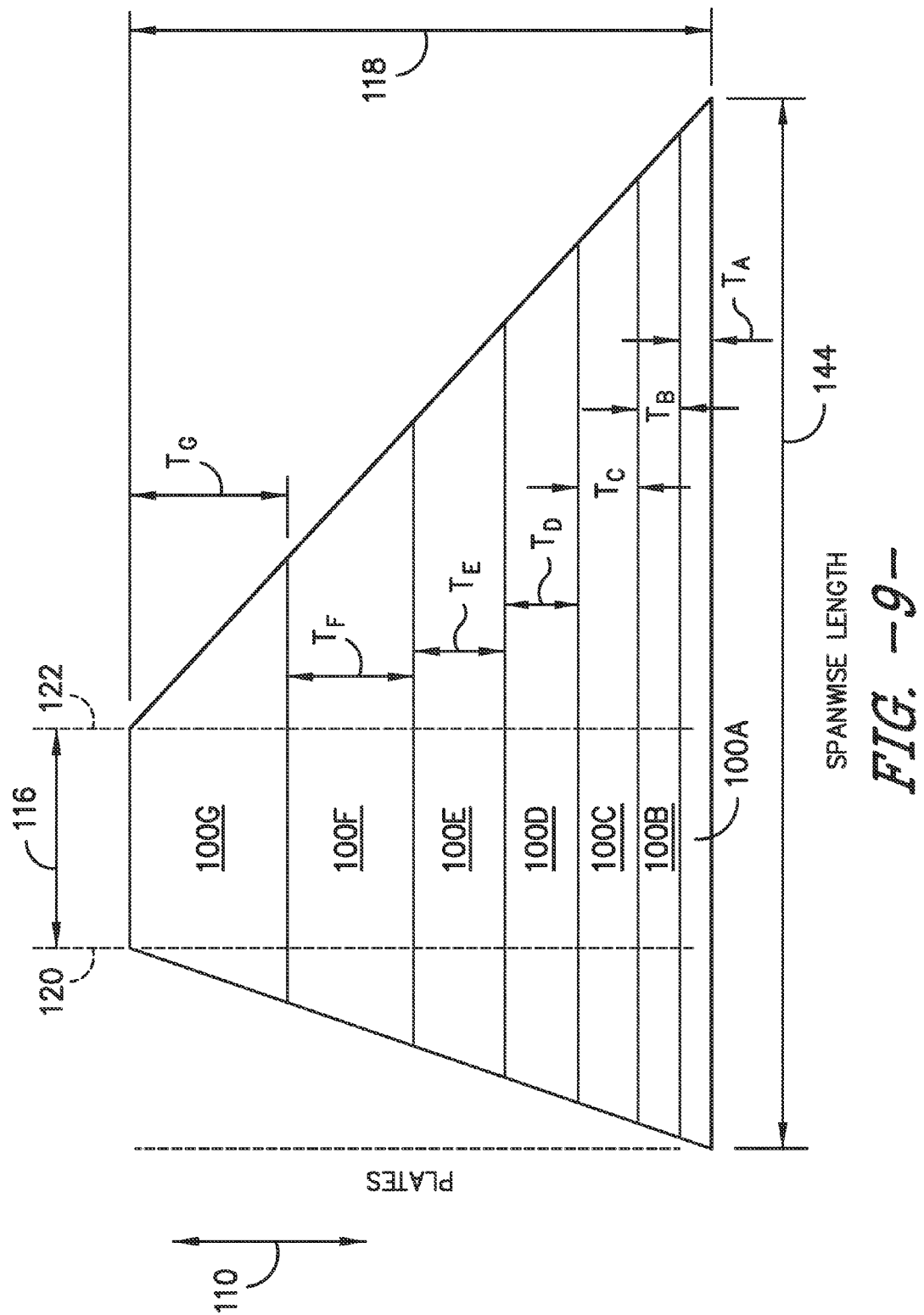
FIG. -9-

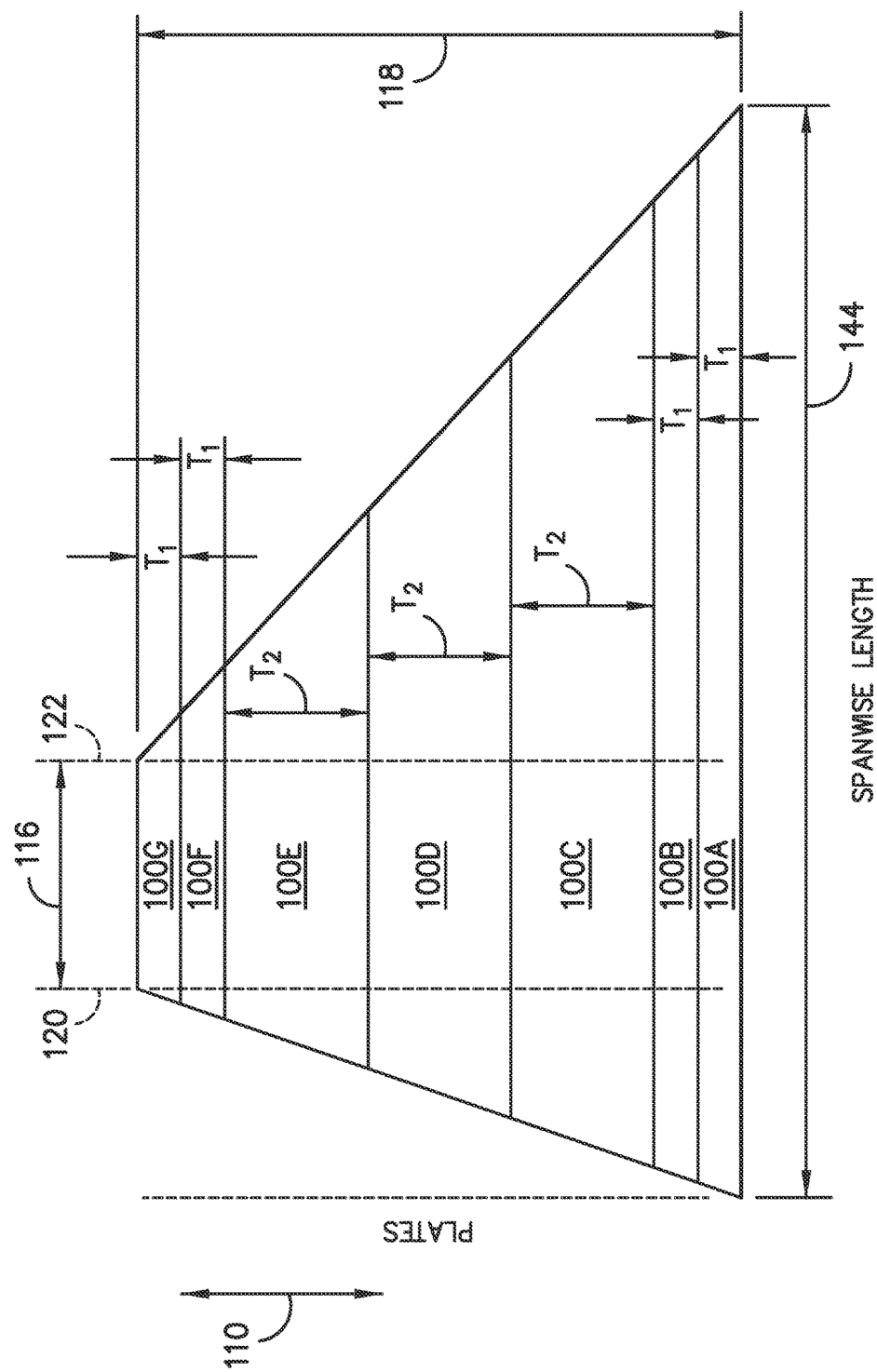

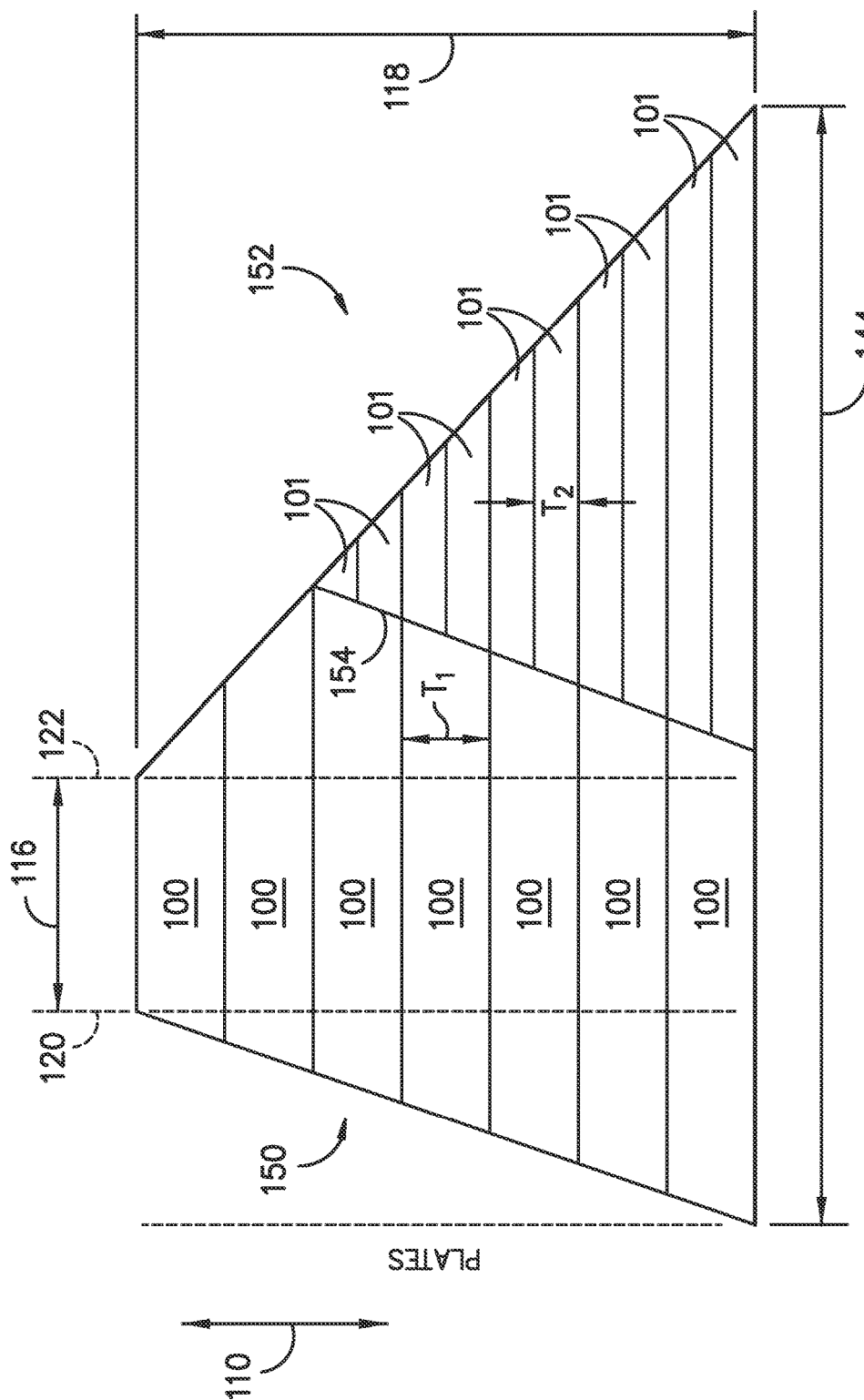
FIG. -11-

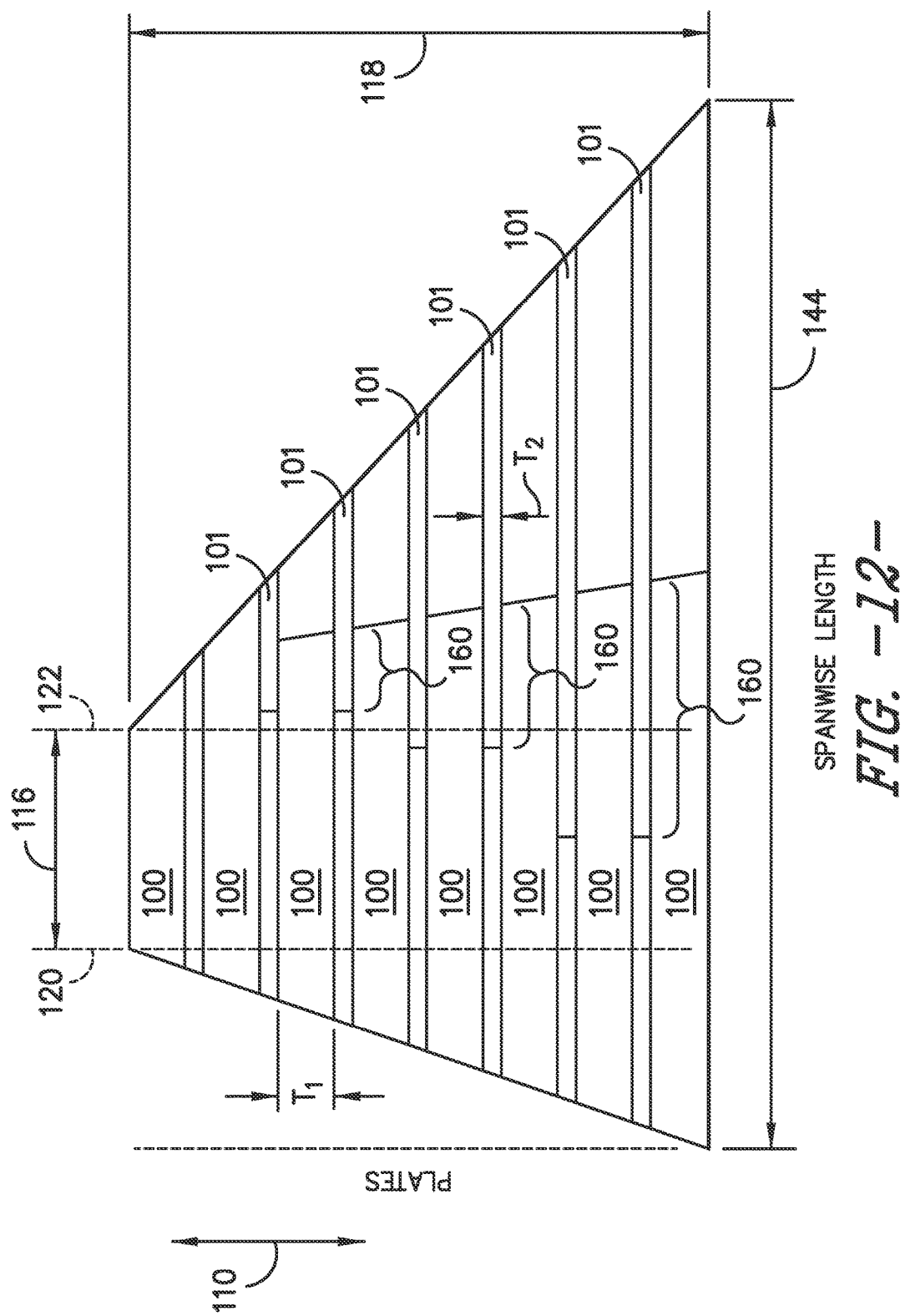

SPAR CAP FOR A WIND TURBINE ROTOR BLADE FORMED FROM PRE-CURED LAMINATE PLATES OF VARYING THICKNESSES

FIELD OF THE INVENTION

The present subject matter relates generally to wind turbines and, more particularly, to a spar cap for a wind turbine rotor blade formed from pre-cured laminate plates having varying thicknesses.

BACKGROUND OF THE INVENTION

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy from wind using known airfoil principles and transmit the kinetic energy through rotational energy to turn a shaft coupling the rotor blades to a gearbox, or if a gearbox is not used, directly to the generator. The generator then converts the mechanical energy to electrical energy that may be deployed to a utility grid.

Wind turbine rotor blades typically include a body shell formed from a composite laminate material. In general, the body shell is relatively lightweight and has structural properties (e.g., stiffness, buckling resistance and strength) which are not configured to withstand the bending moments and other loads exerted on the rotor blade during operation. In addition, wind turbine blades are becoming increasingly longer in order to produce more power. As a result, the blades must be stiffer and thus heavier so as to mitigate loads on the rotor.

To increase the stiffness, buckling resistance and strength of the rotor blade, the body shell is typically reinforced using one or more structural components (e.g. opposed spar caps with a shear web configured therebetween) that engage the inner surfaces of the shell. The spar caps are typically constructed from laminate composites (e.g., glass fiber laminate composites and/or carbon fiber laminate composites) that include dry or non-cured fabric plies that are laid up within the blade mold and subsequently infused with resin. Such materials, however, can be difficult to control during the manufacturing process and/or are often defect prone and/or highly labor intensive due to handling of the non-cured fabrics and the challenges of infusing large laminated structures.

As such, recent attempts have been made to form spar caps from pre-fabricated, pre-cured laminate composites that can be produced in relatively thick plates, and are typically less susceptible to defects. However, the use of such relatively thick, pre-cured laminate plates for forming spar caps still presents unique challenges for blade manufacturers. For example, challenges still exist with respect to achieving the desired spanwise thickness distribution for the spar cap, reducing labor costs/time, reducing strain experienced within the individual plates and/or conforming the plates to the curvature of the rotor blade.

Accordingly, a spar cap configuration formed from an assembly of pre-cured laminate plates that addresses one or more of the current manufacturing challenges described above would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a spar cap for a rotor blade of a wind turbine, wherein the rotor blade includes a blade root, a blade tip and a body shell extending between the blade root and the blade tip. The spar cap may generally include an assembly of pre-cured laminate plates stacked on one top of the other, with the assembly including an outermost pre-cured plate, an innermost pre-cured plate positioned opposite the outermost pre-cured plate and a plurality of intermediate pre-cured plates stacked directly between the outermost and innermost pre-cured plates. The outermost pre-cured plate may be configured to be positioned adjacent to an inner surface of the body shell. In addition, the outermost pre-cured plate may define a plate thickness that differs from a plate thickness defined by the innermost pre-cured plate by at least 50%.

In another aspect, the present subject matter is directed to a spar cap for a rotor blade of a wind turbine, wherein the rotor blade includes a blade root, a blade tip and a body shell extending between the blade root and the blade tip. The spar cap may generally include an assembly of pre-cured laminate plates stacked on one top of the other, with the assembly including an outermost pre-cured plate, an innermost pre-cured plate positioned opposite the outermost pre-cured plate and a plurality of intermediate pre-cured plates stacked directly between the outermost and innermost pre-cured plates. The outermost pre-cured plate may be configured to be positioned adjacent to an inner surface of the body shell. In addition, the outermost pre-cured plate may define a plate thickness corresponding to one of a maximum plate thickness or a minimum plate thickness for the spar cap and the innermost pre-cured plate may define a plate thickness corresponding to the other of the maximum plate thickness or the minimum plate thickness for the spar cap.

In a further aspect, the present subject matter is directed to a spar cap for a rotor blade of a wind turbine, wherein the rotor blade includes a blade root, a blade tip and a body shell extending between the blade root and the blade tip. The spar cap may generally include an assembly of pre-cured laminate plates stacked on one top of the other, with the assembly including a plurality of first pre-cured laminate plates stacked one on top of the other along an inboard region of the spar cap and a plurality of second pre-cured laminate plates stacked one on top of the other along an outboard region of the spar cap. The plate thickness of the first pre-cured laminate plates may be greater than the plate thickness of the second pre-cred laminate plates.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 illustrates a side view of one embodiment of a wind turbine in accordance with aspects of the present subject matter;

FIG. 2 illustrates a perspective view of one embodiment of a rotor blade suitable for use within the wind turbine shown in FIG. 1 in accordance with aspects of the present subject matter;

FIG. 3 illustrates a cross-sectional view of the rotor blade shown in FIG. 2 taken about line 3-3;

FIG. 4 illustrates a close-up view of a portion of the rotor blade shown in FIG. 3, particularly illustrating a spar cap of the rotor blade formed from an assembly of pre-cured laminate plates;

FIG. 5 illustrates a perspective view of a portion of one of the pre-cured laminate plates shown in FIG. 4;

FIG. 6 illustrates a schematic, spanwise view of one embodiment of a spar cap formed from an assembly of pre-cured laminate plates having differing thicknesses, particularly illustrating the outermost plate of the spar cap defining a maximum plate thickness for the spar cap and the innermost plate of the spar cap defining a minimum plate thickness for the spar cap;

FIG. 7 illustrates a schematic, spanwise view of another embodiment of a spar cap formed from an assembly of pre-cured laminate plates having differing thicknesses, particularly illustrating the thickness of the plates being steadily decreased as the spar cap extends from its outermost plate to its innermost plate;

FIG. 8 illustrates a schematic, spanwise view of a further embodiment of a spar cap formed from an assembly of pre-cured laminate plates having differing thicknesses, particularly illustrating the outermost plate of the spar cap defining a minimum plate thickness for the spar cap and the innermost plate of the spar cap defining a maximum plate thickness for the spar cap;

FIG. 9 illustrates a schematic, spanwise view of yet another embodiment of a spar cap formed from an assembly of pre-cured laminate plates having differing thicknesses, particularly illustrating the thickness of the plates being steadily increased as the spar cap extends from its outermost plate to its innermost plate;

FIG. 10 illustrates a schematic, spanwise view of an even further embodiment of a spar cap formed from an assembly of pre-cured laminate plates having differing thicknesses, particularly illustrating the spar cap including thinner plates along its outer and inner portions and thicker plates between its inner and outer portions;

FIG. 11 illustrates a schematic, spanwise view of an embodiment of a spar cap formed from an assembly of pre-cured laminate plates having differing thicknesses, particularly illustrating the spar cap including thicker plates along an inboard region of the spar cap and thinner plates along an outboard region of the spar cap; and FIG. 12 illustrates a schematic, spanwise view of an alternative embodiment of the spar cap shown in FIG. 11, particularly illustrating the thicker and thinner plates being overlapped along the spanwise direction of the rotor blade.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a spar cap formed from pre-cured laminate plates having varying thicknesses. Specifically, the spar cap may be formed from an assembly of pre-cured laminate plates stacked directly one on top of the other, with one or more of the plates defining a thickness that differs from the thickness(es) of the other plate(s). In several embodiments, the pre-cured laminate plates may be assembled together such that one or more of the outermost plates of the spar cap (e.g., the plates positioned closest to the inner surface of the body shell of the rotor blade) define a plate thickness that differs significantly from the plate thickness defined by one or more of the innermost plates of the spar cap (e.g., the plate(s) positioned furthest away from the inner surface of the body shell). For example, in one embodiment, the plate thickness of the outermost plate(s) may differ from the plate thickness of the innermost plate(s) by at least 50%. Alternatively, the innermost and outermost plates may define the same or similar plate thicknesses. In such an embodiment, one or more of the intermediate plates (e.g., the plates positioned between the innermost and outermost plates) may define a plate thickness that differs significantly from the plate thickness defined by the innermost and outermost plates.

Additionally, in a particular embodiment of the present subject matter, the outermost plate(s) of the spar cap may define a maximum plate thickness for the spar cap while the innermost plate(s) of the spar cap may define a minimum plate thickness for the spar cap. Alternatively, the arrangement of the pre-cured laminate plates may be reversed such that the outermost plate(s) of the spar cap define the minimum plate thickness while the innermost plate(s) of the spar cap define the maximum plate thickness.

In another embodiment, the thicknesses of the plates may be varied along the spanwise direction of the rotor blade. For instance, in one embodiment, the spar cap may include thicker plates extending along the inboard region(s) of the rotor blade and thinner plates extending along the outboard region(s) of the blade.

As will be described below, each specific plate arrangement may offer unique advantages when using such plates to form a spar cap for a wind turbine rotor blade. For instance, the use of pre-cured laminate plates having varying thicknesses may allow the overall spanwise thickness distribution for the spar cap to be specifically tailored to meet the particular design requirements for the rotor blade being manufactured. In addition, one or more embodiments of the present subject matter may allow for a reduction in the labor costs/time associated with manufacturing a spar cap and/or a reduction in the strain experienced within the individual plates forming the spar cap and/or may also allow for an improvement in the ability of the outermost spar cap plates to conform to the chordwise curvature of the rotor blade.

It should be appreciated that, in several embodiments, the pre-cured laminate plates of the present subject matter may correspond to pultruded plates. As is generally understood, "pultruded composites" or "pultrusions" generally encompass reinforced materials (e.g. fibers or woven or braided strands) that are impregnated with a resin and pulled through a heated stationary die such that the resin cures or undergoes polymerization. As such, the process of manufacturing pultruded composites is typically characterized by a continuous process of composite materials that produces composite parts having a constant cross-section (e.g., a rectangular cross-section). However, in other embodiments, the pre-cured laminate plates described herein may be formed using any other suitable process, such as a belt-pressing manufacturing process.

Referring now to the drawings, FIG. 1 illustrates a side view of one embodiment of a wind turbine 10. As shown, the wind turbine 10 generally includes a tower 12 extending from a support surface 14 (e.g., the ground, a concrete pad or any other suitable support surface). In addition, the wind turbine 10 may also include a nacelle 16 mounted on the tower 12 and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator (not shown) positioned within the nacelle 16 to permit electrical energy to be produced.

Referring now to FIGS. 2 and 3, one embodiment of a rotor blade 22 suitable for use within the wind turbine 10 shown in FIG. 1 is illustrated in accordance with aspects of the present subject matter. Specifically, FIG. 2 illustrates a perspective view of the rotor blade 22. Additionally, FIG. 3 illustrates a cross-sectional view of the rotor blade 22 taken about line 3-3 shown in FIG. 2.

As shown, the rotor blade 22 generally includes a blade root 24 configured to be mounted or otherwise secured to the hub 20 (FIG. 1) of the wind turbine 10 and a blade tip 26 disposed opposite the blade root 24. Additionally, the rotor blade 22 may include a body shell 28 configured to extend between the blade root 24 and the blade tip 26 along a longitudinal or spanwise axis 30 of the blade 22. The body shell 28 may generally serve as the outer casing/covering of the rotor blade 22 and may define a substantially aerodynamic profile, such as by defining a symmetrical or cambered airfoil-shaped cross-section. As shown in FIG. 3, the body shell 28 may also define a pressure side 32 and a suction side 34 extending between leading and trailing ends 36, 38 of the rotor blade 22. Further, the rotor blade 22 may also have a span 40 defining the total length between the blade root 24 and the blade tip 26 and a chord 42 defining the total length between the leading edge 36 and the trailing edge 38. As is generally understood, the chord 42 may generally vary in length with respect to the span 40 as the rotor blade 22 extends from the blade root 24 to the blade tip 26.

In several embodiments, the body shell 28 of the rotor blade 22 may be formed from a plurality of shell components or sections. For example, in one embodiment, the body shell 28 may be manufactured from a first shell half or section generally defining the pressure side 32 of the rotor blade 22 and a second shell half or section generally defining the suction side 34 of the rotor blade 22, with such shell sections being secured to one another at the leading and trailing ends 36, 38 of the blade 22. Alternatively, the body shell 28 may be formed from any other suitable number and/or arrangement of shell sections. For instance, in one embodiment, the body shell 28 may be segmented along the spanwise axis 30 of the rotor blade 22, with each spanwise segment being formed from one or more shell sections.

Additionally, the body shell 28 may generally be formed from any suitable material. For instance, in one embodiment, the body shell 28 may be formed entirely from a laminate composite material, such as a carbon fiber reinforced laminate composite or a glass fiber reinforced laminate composite. Alternatively, one or more portions of the body shell 28 may be configured as a layered construction and may include a core material, formed from a lightweight material such as wood (e.g., balsa), foam (e.g., extruded polystyrene foam) or a combination of such materials, disposed between layers of laminate composite material.

Referring particularly to FIG. 3, the rotor blade 22 may also include one or more longitudinally extending structural components configured to provide increased stiffness, buckling resistance and/or strength to the blade 22. For example, the rotor blade 22 may include a pair of longitudinally extending spar caps 44, 46 configured to be engaged against the opposing inner surfaces 48, 50 of the pressure and suction sides 32, 34 of the rotor blade 22, respectively. Additionally, one or more shear webs 52 may be disposed between the spar caps 44, 46 so as to form a beam-like configuration. The spar caps 44, 46 may generally be designed to control the bending stresses and/or other loads acting on the rotor blade 22 in a generally spanwise direction (a direction parallel to the span 40 of the rotor blade 22) during operation of a wind turbine 10. Similarly, the spar caps 44, 46 may also be designed to withstand the spanwise compression occurring during operation of the wind turbine 10.

Referring now to FIG. 4, a close-up, cross-sectional view of one of the spar caps 46 shown in FIG. 3 is illustrated in accordance with aspects of the present subject matter, particularly illustrating the spar cap 46 being constructed or formed from a plurality of pre-cured laminate plates 100. In addition, FIG. 5 illustrates a more detailed, cross-sectional view of a portion of one of the pre-cured laminate plates 100 shown in FIG. 4.

In several embodiments, each pre-cured plate 100 may correspond to a pultruded plate. In such embodiments, one or more fiber materials 102 (e.g., glass or carbon fibers) may be cured during the manufacturing process to form each individual pultruded plate. For example, the fibers 102 may be impregnated with at least one resin material 104 using any suitable means. In particular embodiments, the resin material 104 may include any suitable resin, including but not limited to polyester, polyurethane, polybutylene terephthalate (PBT), polyethylene terephthalate (PET), vinyl ester, epoxy, or similar. The impregnated fibers 102 may then be pulled through a heated stationary die such that the resin 104 cures or undergoes polymerization to form each plate 100. The individually formed plates 100 may then be assembled or joined together (e.g., via a secondary infusion process) to form the resulting spar cap 46. For example, as shown in the illustrated embodiment of FIG. 4, each of the pre-cured laminate plates 100 may form a single layer 106 of the spar cap 46. The layers 106 may then be stacked one on top of the other and joined together using any suitable means, for example, by vacuum infusing the plates 100 together or by bonding the plates 100 together via an adhesive, a semi-preg material, or a pre-preg material, to form the spar cap 46.

As particularly shown in FIG. 5, the fibers 102 included within each plate 100 may generally be oriented in a common fiber direction 108. In several embodiments, the fiber direction 108 may extend parallel to the longitudinal or spanwise direction of the rotor blade 22. As such, the fibers 102 contained within each plate 104 used to form the spar cap 46 may generally extending spanwise along the length of the spar cap 46 between the blade root 24 and the blade tip 26.

As shown in FIG. 4, the assembly of pre-cured laminate plates 100 forming the spar cap 46 may include an outermost plate 100A positioned directly adjacent to the inner surface 50 of the body shell 28 of the rotor blade 22, an innermost plate 100G positioned opposite the outermost plate 100A (and, thus, disposed furthest away from the inner surface 50 of the body shell 28) and a plurality of intermediate plates (e.g., plates 100B-100F) positioned between the outermost and innermost plates 100A, 100G. For purposes of illustration, the spar cap 46 is shown in FIG. 4 as being formed from seven pre-cured laminate plates 100. However, in general, the spar cap 46 may be formed from any number of pre-cured laminate plates 100, such as less than seven plates or more than seven plates.

As particularly shown in FIG. 4, in several embodiments, the plates 100 may be configured to define variable thicknesses 112. Specifically, as will be described below, at least one of the plates 100 may be configured to define a plate thickness in a flapwise or thickness direction of the rotor blade 22 (indicated by arrow 110 in FIGS. 3 and 4) that varies from the plate thickness(es) of the other plates 100 used to form the spar cap 46.

In several embodiments, the thicknesses of the plates 100 may be varied such that the plate(s) 100 positioned closest to the inner surface 50 of the body shell 28 (e.g., the outermost plate 100A and, optionally, one or more adjacent plates, such as plates 100B and 100C) define a plate thickness(es) 112A that differs significantly from the plate thickness(es) 112B defined by the plate(s) 100 positioned furthest away from the inner surface 50 of the body shell 28 (e.g., the innermost plate 100G and, optionally, one or more adjacent plates, such as plates 100E and 100F). For instance, in one embodiment, the plate thickness 112A of the plate(s) 100 positioned closest to the inner surface 50 may differ from the plate thickness 112B of the plate(s) 100 positioned furthest away from the inner surface 50 by at least about 50%, such as at least about 60% or at least about 70% or at least about 80% or at least about 90% and/or any other subranges therebetween. As shown in FIG. 4, the plate(s) 100 positioned closest to the inner surface 50 are thicker than the plate(s) 100 positioned furthest away from the inner surface 50. However, as will be described below, in other embodiments, the plate(s) 100 positioned closest to the inner surface 50 may be thinner than the plate(s) 100 positioned furthest away from the inner surface 50.

Referring now to FIG. 6, a schematic, spanwise view of one embodiment of the spar cap 46 shown in FIG. 4 is illustrated in accordance with aspects of the present subject matter. As shown, the various pre-cured laminate plates 100 forming the spar cap 46 may generally be stacked or assembled so as to decrease in spanwise length from the outermost plate 100A to the innermost plate 100G. Specifically, in several embodiments, the outermost plate 100A may generally define the longest spanwise length 114 (e.g., a length equal or substantially equal to the span 40 of the rotor blade 22 such that the plate 100A extends generally from the blade root 24 to the blade tip 26) and the innermost plate 100B may generally define the shortest spanwise length 116 (e.g., a length equal to about 0% to about 30% of the span 40 of the rotor blade 22). Additionally, as shown in FIG. 6, the spanwise ends of the plates 100 may be offset from one another such that spar cap 46 generally defines a tapered thickness distribution or profile along the spanwise direction of the blade 22. Specifically, as shown, an overall thickness 118 of the spar cap 46 may steadily increase from zero or substantially zero at the blade root 24 to a maximum spar cap thickness at a first spanwise location 120 defined along the spar cap 46 (e.g., at a distance from the root 24 equal to about 10% to about 25% of the span 40) and may then remain generally constant from the first spanwise location 120 to a second spanwise location 122 defined along the spar cap 46 (e.g., at a distance from the root 24 equal to about 25% to about 40% of the span 40), with the thickness 118 steadily decreasing from the maximum thickness to zero or substantially zero as the spar cap 46 extends outwardly from the second spanwise location 122 towards the blade tip 26.

It should be appreciated that, in other embodiments, the spar cap 46 may be configured to define any other suitable thickness distribution or profile along its spanwise length. For instance, in another embodiment, the thickness 118 of the spar cap 46 along its spanwise length may taper to a point at the outermost plate 100G such that the thickness distribution/profile of the spar cap 46 has a triangular or pyramidal shape. Alternatively, as opposed to defining a thickness distribution/profile that includes a linear or straight tapered shape, the thickness distribution/profile may define a curvilinear shape in the spanwise direction of the rotor blade 22.

Additionally, as indicated above, the pre-cured laminate plates 100 used to form the spar cap 46 may define varying plate thicknesses. Specifically, in several embodiments, the plates 100 may be stacked or arranged so that the thickest plates are located closest to the inner surface 50 of the blade shell 28. For instance, as shown in FIG. 6, the plates 100 used to form the spar cap 46 define three different plate thicknesses (e.g., thicknesses $T_1$, $T_2$, $T_3$), with the three outermost plates (e.g., 100A, 100B, 100C) defining the maximum plate thickness ($T_1$) of the spar cap 46, the three innermost plates (e.g., 100G, 100F, 100E) defining the minimum plate thickness ($T_2$) for the spar cap 46 and the central plate (e.g., 100D) defining an intermediate plate thickness ($T_3$) for the spar cap 46.

In other embodiments, the thicknesses of the plates 100 used to form the spar cap 46 may be varied in any other suitable manner that provides for the plate(s) positioned closest to the inner surface 50 of the blade shell 28 to be thicker than the plate(s) positioned further away from the inner surface 50. For instance, in one embodiment, as opposed to defining three different plate thicknesses, the plates 100 used to form the spar cap 46 may only define two different thicknesses. In such an embodiment, the plates 100 may be assembled such that the thicker plates are positioned closest to the inner surface 50 of the blade shell 28 and the thinner plates are positioned further away from the inner surface 50.

Alternatively, the spar cap 46 may be formed from plates 100 defining more than three different plate thicknesses. For instance, in one embodiment, each plate 100 may be configured to define a plate thickness that differs from the plate thicknesses of the other plates 100 used to form the spar cap 46. An example of such an embodiment is illustrated in FIG. 7. As shown, the outermost plate 100A may be configured to define a maximum plate thickness (e.g., thickness $T_A$) for the spar cap 46 and the innermost plate 100G may be configured to define a minimum plate thickness (e.g., thickness $T_G$) for the spar cap 46, with the plate thicknesses of the intermediate plates 100B-100F (e.g., thicknesses $T_B$-$T_F$) steadily decreasing from the outermost plate 100A and the innermost plate 100G. As such, the thicknesses of the plates 100 may continuously decrease as the spar cap 46 extends in the thickness direction 118 of the rotor blade 22 from the outermost plate 100A to the innermost plate 100G.

It should be appreciated that, in several embodiments, the minimum plate thickness for the plates 100 used to form the spar cap 46 may be equal to less than about 50% of the maximum plate thickness for the plates 100. For instance, in a particular embodiment, the minimum plate thickness may be equal to less than about 40% of the maximum plate thickness, such as less than about 30% of the maximum plate thickness or less than about 20% of the maximum plate thickness or less than about 10% of the maximum plate thickness and/or any other subranges therebetween.

It should also be appreciated that, by assembling the pre-cured laminate plates 100 so that the outermost plate(s) of the spar cap 46 corresponds to the thickest plate(s) and the innermost plate(s) of the spar cap 46 correspond to the thinnest plate(s), various advantages may be achieved. For instance, given that the outermost plate(s) defines the longest spanwise length(s), all or a significant portion of both the thickness and span of the spar cap 46 may be laid up using fewer plates, thereby reducing the labor time/costs associated with assembling the plates. In addition, since thicker plates are often more susceptible to cracking at their ends, the use of thicker plates as the outermost plates for the spar cap 46 may ensure that the plates terminate in low strain regions of the blade 22 (e.g., at or adjacent to the blade root 24 and the blade tip 26) as opposed to the higher strain regions of the blade 22 (e.g., along the portion of the span 40 across which the maximum spar cap thickness 118 is defined). Moreover, the use of thinner plates 100 as the innermost plate(s) for the spar cap may allow for finer adjustments to be made to the overall spar cap thickness, thereby allowing the spanwise thickness distribution to be specifically tailored.

Referring now to FIG. 8, a schematic, spanwise view of another embodiment of a spar cap 46 formed from a plurality of pre-cured laminate plates 100 defining varying thicknesses is illustrated in accordance with aspects of the present subject matter. As shown, in contrast to the embodiments described above with reference to FIGS. 6 and 7, the plates 100 may be stacked or arranged so that the thinnest plates are located closest to the inner surface 50 of the blade shell 28. For instance, as shown in FIG. 8, the plates 100 used to form the spar cap 46 define three different plate thicknesses (e.g., thicknesses $T_1$, $T_2$, $T_3$), with the three outermost plates (e.g., 100A, 100B, 100C) defining the minimum plate thickness ($T_3$) of the spar cap 46, the three innermost plates (e.g., 100G, 100F, 100E) defining the maximum plate thickness ($T_2$) for the spar cap 46 and the central plate (e.g., 100D) defining an intermediate plate thickness ($T_3$) for the spar cap 46.

In other embodiments, the thicknesses of the plates 100 used to form the spar cap 46 may be varied in any other suitable manner that provides for the plate(s) positioned closest to the inner surface 50 of the blade shell 28 to be thinner than the plate(s) positioned further away from the inner surface 50. For instance, in one embodiment, as opposed to defining three different plate thicknesses, the plates 100 used to form the spar cap 46 may only define two different thicknesses. In such an embodiment, the plates 100 may be assembled such that the thinner plates are positioned closest to the inner surface 50 of the blade shell 28 and the thicker plates are positioned further away from the inner surface 50.

Alternatively, the spar cap 46 may be formed from plates 100 defining more than three different plate thicknesses. For instance, in one embodiment, each plate 100 may be configured to define a plate thickness that differs from the plate thicknesses of the other plates 100 used to form the spar cap 46. An example of such an embodiment is illustrated in FIG. 9. As shown, the outermost plate 100A may be configured to define a minimum plate thickness (e.g., thickness $T_A$) for the spar cap 46 and the innermost plate 100G may be configured to define a maximum plate thickness (e.g., thickness $T_G$) for the spar cap 46, with the plate thicknesses of the intermediate plates 100B-100F (e.g., thicknesses $T_B$-$T_F$) steadily increasing from the outermost plate 100A and the innermost plate 100G. As such, the thicknesses of the plates 100 may continuously increase as the spar cap 46 extends in the thickness direction 118 of the rotor blade 22 from the outermost plate 100A to the innermost plate 100G.

It should be appreciated that, by assembling the pre-cured laminate plates 100 such that the outermost plate(s) of the spar cap 46 corresponds to the thinnest plate(s) and the innermost plate(s) of the spar cap 46 corresponds to the thickest plate(s), various unique advantages may be achieved (e.g., advantages that differ from the advantages provided when using configurations similar to those shown in FIGS. 6 and 7). For instance, as compared to thicker plates, thinner plates may exhibit increased chordwise flexibility. As such, the use of one or more thinner plates as the outermost plate(s) for the spar cap 46 may allow for the plate(s) to more easily conform to the chordwise curvature of the rotor blade 22. This may be particularly true for the areas of the rotor blade 22 defining significantly high chordwise curvatures (e.g., at outboard regions of the rotor blade 22 defined beyond 50% of the blade span 40). After placing the thinner plates to make up the curvature of the airfoil, the thicker plates may then be added as short plies, which are typically located at inboard regions of the rotor blade 22 (e.g., less than 50% of the blade span 40 from the blade root 24) that define less chordwise curvature. In addition, thinner plates are able to be rolled up and/or otherwise handled more easily. As such, it may be desirable to use thinner plates to form the longer outermost plate(s) since longer, thinner plates can be transported more easily than longer, thicker plates.

Referring now to FIG. 10, a schematic, spanwise view of another embodiment of a spar cap 46 formed from a plurality of pre-cured laminate plates 100 defining varying thicknesses is illustrated in accordance with aspects of the present subject matter. As shown, in contrast to the embodiments described above with reference to FIGS. 6-9, the plates 100 may be stacked or arranged so that the thinner plates are located along the outer and inner portions of the spar cap 46, with the thicker plates being more centrally located within the spar cap 46 along its thickness direction 110. For instance, as shown in FIG. 10, the two outermost plates (e.g., plates 100A and 100B) and the two innermost plates (e.g., plates 100G and 100F) correspond to the thinnest plates (e.g., by defining a minimum plate thickness $T_1$ of the spar cap 46), with the intermediate plates (e.g., plates 100C, 100D and 100E) positioned between the innermost and outermost plates corresponding to the thickest plates (e.g., by defining a maximum plate thickness $T_2$ of the spar cap 46).

It should be appreciated that, in other embodiments, the thicknesses of the plates 100 used to form the spar cap 46 may be varied in any other suitable manner that provides for the plate(s) located along the outer and inner portions of the spar cap 46 to be thinner than the more centrally located plate(s). For instance, in one embodiment, the outermost plate(s) (e.g., plates 100A and 100B) may define a differing thickness than the innermost plate(s) (e.g., plates 100G and 100F), with the thicknesses of such plates still being thinner than the more centrally located plate(s) (e.g., plates 100C, 100D and 100E). Similarly, the centrally located plate(s) need not define a uniform thickness. For example, in another embodiment, the centrally located plates (e.g., plates 100C, 100D and 100E) may define varying thicknesses, with the thicknesses of such plates still being thicker than the outermost and innermost plates.

It should also be appreciated that, by assembling the pre-cured laminate plates 100 in the same or a similar manner to that shown in FIG. 10, various advantages may be achieved. For example, the use of one or more thinner plates as the outermost plate(s) for the spar cap 46 may allow for the plate(s) to more easily conform to the chordwise curvature of the rotor blade 22 while the use of one or more thinner plates as the innermost plate(s) for the spar cap 46 may allow for finer adjustments to be made to the overall spar cap thickness. In addition, by using one or more thicker plates as the intermediate plate(s), the thickness of the spar cap 46 may be built-up quickly using fewer plates.

Referring now to FIG. 11, a schematic, spanwise view of another embodiment of a spar cap 46 formed from a plurality of pre-cured laminate plates 100, 101 defining varying thicknesses is illustrated in accordance with aspects of the present subject matter. As shown, in contrast to the embodiments described above with reference to FIGS. 6-10, the thickness of the plates 100, 101 is varied in the spanwise direction of the rotor blade 22 as opposed to the thickness direction 110. Specifically, in several embodiments, a plurality of thicker plates 100 may be stacked one on top of the other to form an inboard portion 150 of the spar cap 46 that extends outwardly from the blade root 24 and a plurality of thinner plates 101 may be stacked one on top of the other to form an outboard portion 152 of the spar cap 46 that extends outwardly from the inboard portion 150 of the spar cap 46 towards the blade tip 26. As shown in FIG. 11, the thicker plates 100 may generally define a plate thickness ($T_1$) that is greater than the plate thickness ($T_2$) of the thinner plates 101.

It should be appreciated that, although the thicker plates 100 are shown in FIG. 11 as defining a uniform plate thickness ($T_1$), the thicknesses of such plates 100 may also be varied along the thickness direction 110 of the spar cap 46, such as by varying the thicknesses of such plates 100 between the innermost and outermost plates. Similarly, it should be appreciated that, although the thinner plates 101 are shown in FIG. 11 as defining a uniform plate thickness ($T_2$), the thicknesses of such plates 101 may also be varied along the thickness direction 110 of the spar cap 46, such as by varying the thickness of such plates 101 between the innermost and outermost plates.

It should also be appreciated that the specific spanwise location(s) at which the spar cap transitions from the thicker plates 100 to the thinner plates 101 may generally vary depending on the desired spar cap characteristics and/or the configuration of the corresponding rotor blade 22. However, in general, the transition location may be selected such that the thinner plates 101 extend along the outboard region(s) of the rotor blade 22 having the highest chordwise curvature, thereby allowing such plates 101 to be used to more easily conform to the blade curvature. For example, in the embodiment shown in FIG. 11, the spar cap 46 transitions from the thicker plates 100 to the thinner plates 101 at a spanwise transition location(s) (e.g., along a tapered transition line 154) ranging from about 40% to about 60% of the span 40 of the rotor blade 22. However, in other embodiments, the spanwise transition location(s) may be defined at a location(s) inboard of 40% of the blade span 40 or at location(s) outboard of 60% of the blade span 40. Additionally, it should be appreciated that, although the spar cap 46 illustrated in FIG. 11 is shown as transitioning from the thicker plates 100 to the thinner plates 101 at spanwise locations further outboard from the blade root 24 as the spar cap 46 extends in the thickness direction 110 between its outermost and innermost plated (e.g., along the tapered transition line 154) the transition between the thicker plates 100 and the thinner plates 101 may be tapered in the opposite direction or may occur at a single spanwise location (e.g., along a transition line extending parallel to the thickness direction 110).

Moreover, as an alternative to the end-to-end transition shown in FIG. 11, the plates 100, 101 may be configured to overlap one another in the spanwise direction as the spar cap 46 transitions form the thicker plates 100 to the thinner plates 101. For example, FIG. 12 illustrates an alternative embodiment of the spar cap 46 shown in FIG. 11 having overlapping or inter-leafed thicker and thinner plates 100, 101. It should be appreciated that, for purposes of illustration, adjacent thicker plates 100 and adjacent thinner plates 101 of the spar cap 46 have been shown as being spaced apart to clearly illustrate the overlap between the thicker and thinner plates 100, 101. One of ordinary skill in the art should readily appreciate that the adjacent thicker plates 100 and the adjacent thinner plates 101 would be stacked one on top of the other during assembly so that the obvious gaps shown in FIG. 12 would not be present.

As shown in FIG. 12, the thicker plates 100 and the thinner plates 101 are inter-leafed with one another such that an overlapped region 160 is defined between each thinner plate 101 and the adjacent thicker plates 100. Such overlapping of the thicker plates 100 and the thinner plates 101 along the transition region of the spar cap 46 may allow for loads to be transferred between such plates 100, 101 via interlaminar shear, which may increase the load carrying capability of the spar cap 46.

It should be appreciated that the various plate configurations shown in FIGS. 6-12 are simply provided as examples of suitable stacking arrangements using pre-cured laminate plates of differing thicknesses. In other embodiments, any other suitable stacking arrangement may be utilized, including any suitable pattern of thick and thin plates. For example, in one embodiment, the plates may be alternated between thick and thin plates as the spar cap is assembled in the thickness direction.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A spar cap for a rotor blade of a wind turbine, the rotor blade including a blade root, a blade tip and a body shell extending between the blade root and the blade tip, the spar cap comprising:

an assembly of pre-cured laminate plates stacked one on top of the other, the assembly of pre-cured laminate plates including an outermost pre-cured plate, an innermost pre-cured plate positioned opposite the outermost pre-cured plate and a plurality of intermediate pre-cured plates stacked directly between the outermost and innermost pre-cured plates, the outermost pre-cured plate configured to be positioned adjacent to an inner surface of the body shell, wherein the outermost pre-cured plate defines a plate thickness that differs from a plate thickness defined by the innermost pre-cured plate by at least 50%, and wherein the plurality of intermediate pre-cured plates are arranged such that a plate thickness of the plurality of intermediate pre-cured plates continuously decreases or continuously increases between adjacent pre-cured plates of the plurality of intermediate pre-cured plates as the spar cap extends between the outermost pre-cured plate and the innermost pre-cured plate.

2. The spar cap of claim 1, wherein the plate thickness of the outermost pre-cured plate corresponds to a maximum plate thickness for the spar cap and the plate thickness of the innermost pre-cured plate corresponds to a minimum plate thickness for the spar cap.

3. The spar cap of claim 1, wherein the plate thickness of the outermost pre-cured plate corresponds to a minimum plate thickness for the spar cap and the plate thickness of the innermost pre-cured plate corresponds to a maximum plate thickness for the spar cap.

4. The spar cap of claim 1, wherein each of the plurality of pre-cured laminate plates corresponds to a pultruded plate.

5. A spar cap for a rotor blade of a wind turbine, the rotor blade including a blade root, a blade tip and a body shell extending between the blade root and the blade tip, the spar cap comprising:

an assembly of pre-cured laminate plates stacked one on top of the other, the assembly of pre-cured laminate plates including an outermost pre-cured plate, an innermost pre-cured plate positioned opposite the outermost pre-cured plate and a plurality of intermediate pre-cured plates stacked directly between the outermost and innermost pre-cured plates, the outermost pre-cured plate configured to be positioned adjacent to an inner surface of the body shell, wherein the outermost pre-cured plate defines a plate thickness corresponding to one of a maximum plate thickness or a minimum plate thickness for the spar cap and the innermost pre-cured plate defines a plate thickness corresponding to the other of the maximum plate thickness or the minimum plate thickness for the spar cap, and wherein the plurality of intermediate pre-cured plates are arranged such that a plate thickness of the plurality of intermediate pre-cured plates continuously decreases or continuously increases between adjacent pre-cured plates of the plurality of intermediate pre-cured plates as the spar cap extends between the outermost pre-cured plate and the innermost pre-cured plate.

6. The spar cap of claim 5, wherein the plate thickness of the outermost pre-cured plate corresponds to the maximum plate thickness and the plate thickness of the innermost pre-cured plate corresponds to the minimum plate thickness.

7. The spar cap of claim 6, wherein the plate thickness of the plurality of intermediate pre-cured plates is continuously decreased as the spar cap extends between the outermost pre-cured plate and the innermost pre-cured plate.

8. The spar cap of claim 5, wherein the plate thickness of the outermost pre-cured plate corresponds to the minimum plate thickness and the plate thickness of the innermost pre-cured plate corresponds to the maximum plate thickness.

9. The spar cap of claim 8, wherein the plate thickness of the plurality of intermediate pre-cured plates is continuously increased as the spar cap extends between the outermost pre-cured plate and the innermost pre-cured plate.

10. The spar cap of claim 5, wherein the minimum plate thickness is equal to less than about 50% of the maximum plate thickness.

11. The spar cap of claim 10, wherein the minimum plate thickness is equal to less than about 20% of the maximum plate thickness.

12. The spar cap of claim 5, wherein each of the plurality of pre-cured laminate plates corresponds to a pultruded plate.

13. A spar cap for a rotor blade of a wind turbine, the rotor blade including a blade root, a blade tip and a body shell extending between the blade root and the blade tip, the spar cap comprising:

an assembly of pre-cured laminate plates, the assembly of pre-cured laminate plates including a plurality of first pre-cured laminate plates stacked one on top of the other along an inboard region of the spar cap and a plurality of second pre-cured laminate plates stacked one on top of the other along an outboard region of the spar cap, wherein the plurality of first and second pre-cured laminate plates are inter-leafed such that an overlapped region is defined between each second pre-cured laminate plate and each pair of adjacent first pre-cured laminate plates along a spanwise direction of the spar cap, and wherein, at least in the overlapped region, a plate thickness of the plurality of first pre-cured laminate plates is greater than a plate thickness of the plurality of second pre-cured laminate plates.

14. The spar cap of claim 13, wherein the spar cap transitions from the inboard region to the outboard region at a spanwise location ranging from about 40% to about 60% of a span of the rotor blade.

15. The spar cap of claim 13, wherein at least one of the plurality of first pre-cured laminate plates define a plate thickness corresponding to a maximum plate thickness for the spar cap and wherein at least one of the plurality of second pre-cured laminate plates define a plate thickness corresponding to a minimum plate thickness for the spar cap.

* * * * *